(12) United States Patent
Rippert et al.

(10) Patent No.: US 8,915,201 B2
(45) Date of Patent: Dec. 23, 2014

(54) DEVICE AND METHOD FOR PRODUCING A REINFORCED FOAM MATERIAL

(75) Inventors: Jörg Rippert, Zwingenberg (DE); Uwe Lang, Nieste (DE); Matthias Alexander Roth, Griesheim (DE); Hans-Jürgen Weber, Verden (DE); Gregor Christian Endres, Pfaffenhofer/Lim (DE)

(73) Assignees: Airbus Operations GmbH (DE); Evonik Roehm GmbH (DE)

( * ) Notice: Subject to any disclaimer, the term of this patent is extended or adjusted under 35 U.S.C. 154(b) by 1135 days.

(21) Appl. No.: 12/743,014

(22) PCT Filed: Nov. 20, 2008

(86) PCT No.: PCT/EP2008/065923
§ 371 (c)(1),
(2), (4) Date: Jun. 2, 2010

(87) PCT Pub. No.: WO2009/065896
PCT Pub. Date: May 28, 2009

(65) Prior Publication Data
US 2010/0263504 A1    Oct. 21, 2010

Related U.S. Application Data

(60) Provisional application No. 61/004,004, filed on Nov. 21, 2007.

(30) Foreign Application Priority Data

Nov. 21, 2007   (DE) .................. 10 2007 055 684

(51) Int. Cl.
*D05B 39/00*    (2006.01)
*B29C 70/08*    (2006.01)
*B29C 70/24*    (2006.01)
*B29K 105/04*   (2006.01)

(52) U.S. Cl.
CPC .......... *B29C 70/086* (2013.01); *B29K 2105/04* (2013.01); *B29C 70/24* (2013.01)
USPC .................................... 112/470.14

(58) Field of Classification Search
USPC ............. 112/470.14, 470.27, 475.04, 475.08, 112/470.18; 428/56, 309.9, 311.71, 314.4
See application file for complete search history.

(56) References Cited

U.S. PATENT DOCUMENTS

| 2,692,219 A | 10/1954 | Slayet et al. |
| 3,030,256 A | 4/1962  | Rosenthal |

(Continued)

FOREIGN PATENT DOCUMENTS

| DE | 1 951 310   | 4/1970 |
| DE | 9110061 U1  | 4/1992 |

(Continued)

OTHER PUBLICATIONS

Potluri et al., "Novel stitch-bonded sandwich composite structures", Composite Structures 59 (2003) 251-259.

(Continued)

*Primary Examiner* — Tejash Patel
(74) *Attorney, Agent, or Firm* — Lerner, David, Littenberg, Krumholz & Mentlik, LLP

(57) ABSTRACT

The invention relates to a device for producing a reinforced foam material and for receiving a textile semifinished product in a hook. To this end, the device has a first subunit having a transport device and a second subunit having a receiving device. The transport device is designed to convey the textile semifinished product into the receiving device, and the first subunit and the second subunit are designed such that the textile semifinished product can be presented in defined length by a relative movement of the first subunit relative to the second subunit. Furthermore, the receiving device of the second subunit is set up such that the textile semifinished product can be placed in the hooks by a relative movement of the receiving device relative to the hook.

18 Claims, 7 Drawing Sheets

(56) References Cited

U.S. PATENT DOCUMENTS

| | | |
|---|---|---|
| 3,207,107 A | 9/1965 | Ferre |
| 3,240,176 A | 3/1966 | Morrison |
| 3,328,218 A | 6/1967 | Noyes |
| 4,196,251 A | 4/1980 | Windecker |
| 4,206,895 A | 6/1980 | Olez |
| 4,380,253 A | 4/1983 | Mead et al. |
| 4,426,414 A * | 1/1984 | Wilkerson .................... 428/102 |
| 4,506,611 A | 3/1985 | Parker et al. |
| 4,622,908 A * | 11/1986 | Tranberg ................ 112/475.08 |
| 4,854,250 A | 8/1989 | Stuvecke et al. |
| 5,308,228 A | 5/1994 | Benoit et al. |
| 5,580,412 A | 12/1996 | Fantino |
| 5,624,622 A | 4/1997 | Boyce et al. |
| 5,741,574 A | 4/1998 | Boyce et al. |
| 5,833,802 A | 11/1998 | Yasui et al. |
| 5,834,082 A * | 11/1998 | Day ................................. 428/56 |
| 5,935,680 A | 8/1999 | Childress |
| 6,027,798 A | 2/2000 | Childress |
| 6,187,411 B1 | 2/2001 | Palmer |
| 6,740,381 B2 | 5/2004 | Day et al. |
| 7,105,071 B2 | 9/2006 | Johnson et al. |
| 7,652,075 B2 | 1/2010 | Lang et al. |
| 2002/0153084 A1 | 10/2002 | Johnson et al. |
| 2004/0258388 A1 | 12/2004 | Kim et al. |
| 2005/0025948 A1 | 2/2005 | Johnson et al. |
| 2009/0229761 A1 | 9/2009 | Joern et al. |

FOREIGN PATENT DOCUMENTS

| | | |
|---|---|---|
| DE | 697 06 829 T | 11/1998 |
| DE | 10018035 A1 | 10/2001 |
| DE | 102005024408 A1 | 11/2006 |
| DE | 102005034400 A1 | 2/2007 |
| EP | 0 902 135 A1 | 3/1999 |
| EP | 1 348 790 A1 | 10/2003 |
| FR | 2718670 A1 | 10/1995 |
| GB | 2245862 A | 1/1992 |
| JP | 63-092769 | 4/1988 |
| JP | 01-129294 | 9/1989 |
| JP | 05-272031 | 10/1993 |
| JP | 05-508362 T | 11/1993 |
| JP | 06-270310 A | 9/1994 |
| JP | 08-033406 | 2/1996 |
| JP | 2001-007625 A | 1/2001 |
| JP | 2001-246686 A | 9/2001 |
| JP | 2003019763 A | 1/2003 |
| JP | 2007-502231 T | 2/2007 |
| RU | 2093362 C1 | 10/1997 |
| WO | 92/00845 A1 | 1/1992 |
| WO | 97/28399 A1 | 8/1997 |
| WO | 2006125561 A1 | 11/2006 |

OTHER PUBLICATIONS

Potluri et al., "Structural performance of orthogonal and bias stitched sandwich structures with rigit close-cellular foams", 44th AIAA/ASME/ASCE/AHS Structures, Structural Dynamics, and Materials Confere, Apr. 7-10, 2003, Norfolk, Virginia, pp. 1-7.

Stanley et al., "Developement and evaluation of stitched sandwich panels", NASA/CR-2001-211025, , Jun. 2001, 166 pages.

Japanese Office Action for Application No. 2008-512738 dated Dec. 13, 2011.

Taiwanese Office Action for Application No. 097145248 dated Apr. 22, 2014.

* cited by examiner

DEVICE AND METHOD FOR PRODUCING A REINFORCED FOAM MATERIAL

CROSS-REFERENCE TO RELATED APPLICATIONS

This application is a national phase entry under 35 U.S.C. §371 of International Application No. PCT/EP2008/065923, filed Nov. 20, 2008, published in German, which claims the benefit of the filing date of U.S. Provisional Patent Application No. 61/004,004, filed on Nov. 21, 2007, and German Patent Application No. 10 2007 055 684.7, filed on Nov. 21, 2007, the disclosures of which are hereby incorporated herein by reference.

TECHNICAL FIELD

The present invention relates to the technical field of manufacturing composite materials. In particular, the invention relates to apparatus for manufacturing a reinforced cellular material and for taking up a semi-finished textile product in a hook. Furthermore, the invention relates to a system for manufacturing reinforced cellular materials, as well as to a method for taking up semi-finished textile products in a hook, for the reinforcement of cellular materials. Likewise, the invention relates to the use of a reinforced cellular material in an aircraft, as well as to an aircraft comprising such a reinforced cellular material.

BACKGROUND TO THE INVENTION

Due to their good ratio of rigidity or strength to density, composite materials, and in particular sandwich constructions, are widely applied in many areas of aircraft engineering. Generally speaking, sandwich constructions are made from a top face sheet or face layer and a bottom face sheet or face layer, between which layers or sheets, for the purpose of increasing rigidity, there is a honeycomb-like core structure formed by vertically extending cells with hexagonal cross sections.

The specific mechanical potential of cellular materials, when compared to such honeycomb structures, is lower due to their structure. Nevertheless, above all in the manufacture of components and in the region of expanded component characteristics, cellular materials are of interest due to their multifunctionality for application in sandwich constructions for structural aeronautical applications. For this reason various experiments are being carried out in an attempt to improve the mechanical characteristics of the cellular materials without incurring an excessive increase in density. By means of sewing techniques, the incorporation of pins, or by means of similar methods, the core is locally reinforced without incurring a considerable increase in the weight of the structure. Moreover, in various methods there is an option, by means of local variation in the pin density and in the pin angle, of tailoring the mechanical characteristics of the core structure to a particular case of application as well as tailoring them locally. Apart from the mechanical characteristics that are of interest from the point of view of statics, these core structures in addition comprise characteristics that are very interesting as far as the impact or the degree of impact damage is concerned. For example, in reinforced cellular materials a crack-stopping effect can be detected.

Among other things in the region of thermal and acoustic insulation, as well as in their manufacture, these sandwich constructions comprising a high-resistance cellular material core are associated with advantages when compared to honeycomb structures, but they are associated with disadvantages in that they comprise only comparatively poor mechanical characteristics. In order to compensate for these mechanical disadvantages, sewing techniques are used by means of which it becomes possible to incorporate fibres, fibre bundles or threads in high-resistance cellular material components. After a resin infiltration process, the regions interspersed with fibres then contribute to the mechanical reinforcement of the cellular material.

The sewing methods that are commonly used to reinforce cellular materials consist of penetrating a cellular material by means of a needle, and in this process at the same time of pulling the thread or the fibre bundles or fibres through the high-resistance cellular material. Two different methods are used to fix the thread.

Firstly, by means of the sewing method known as tufting, a thread can be pulled through the high-resistance cellular material layer, and can be affixed to a substrate, for example silicon rubber, situated on the opposite face. After completion of the seam the substrate can be removed.

The second sewing method belongs to the category of double-face sewing methods, wherein an upper thread from a face layer of the sandwich construction is stitched through the layer construction with a needle. Subsequently the upper thread is affixed, by means of a bottom thread, to the opposite face of the layer construction.

Due to the fact that the needle and the thread enter the cellular material at the same time, a hole size is generated in the cellular material, which hole size is larger than the diameter of the incorporated fibre quantity. For example, if the high-resistance cellular material is further processed, for example during infiltration, the remaining void of the holes, which void is not filled by fibre bundles, is filled by the resin.

The known sewing methods have one aspect in common, namely that first a needle penetrates the cellular material and in this process at the same time incorporates the thread in the cellular material. In this process during insertion in the cellular material the thread extends parallel to, and essentially over the entire length of, the needle. The hole size of the insertion hole is thus determined by the needle diameter and the thickness of the thread.

All these known methods are associated with a disadvantage in that after withdrawal of the needle from the cellular material the remaining hole is too large in relation to the thickness of the incorporated thread. This leads to a situation in which after infiltration with a resin the hole region that is not taken up by fibres is filled with resin, and consequently the improvement in the mechanical characteristics is not implemented by the fibres, as desired, but instead, depending on the method, is essentially implemented by the incorporated resin. However, the improvement of the specific, i.e. weight-related, mechanical characteristics is insufficient, when compared to those of honeycomb structures, for the light-weight construction potential necessary in aircraft engineering, so that the use of cellular materials reinforced in this way can only seldom be considered.

In order to illustrate the importance and the advantages of the present invention, the following should be added in the context of the technical field of manufacturing reinforced materials:

Investigations of the effects of titanium pin reinforcements on the failure pattern of the sandwich construction have shown that in the case of reinforced cellular materials the area of damage clearly remains limited to the region within an inner row. It is thus clear that the damage is locally confined. During further investigations the effects of the space between reinforced regions can be determined. If, in a relative dense reinforcement, failure of the face sheets is due to complex interaction of local and global flexing and shear failure of the face sheets, when the rigidity is reduced, due to the lower reinforcement density the face sheet failure is dominated by bending. The damage pattern shows localised damage and micro cracks in the impacted face layer, but no damage on the reverse face. In the region of the impact the pins that have penetrated the face layers have been pulled out. Furthermore, fibre rupture occurs, as does local separation of the core from the face layer in the region of impact. These practical results agree well with theoretical simulations. Also in this context CAI investigations can be made; they show that in the case of a non-reinforced cellular material the main failure mechanism consists of microbuckling of the face sheets. However, in the case of reinforced cellular materials, separation/release of the pins is the main failure mechanism. Apart from the NDT behaviour of reinforced cellular materials it is also possible to investigate the dependencies on the reinforcement angle. One result demonstrates that the limiting value for the introduction of damage as a result of pulling the pins from the face layer depends strongly on the pin angle. In the case of a 10° reinforcement the limiting value at which damage that is worth mentioning occurs is more than twice the value in the case of a 20° reinforcement. Investigation (both experimental and by means of FEM-analysis) of the energy absorption capacity of reinforced cellular materials subjected to pressure loads shows that by increasing the thickness the energy absorption capacity can be greatly increased. It is important to ensure that the space between reinforcement elements is less than half the wavelength of the folds that are created in a non-reinforced sandwich construction of the same design.

Reinforcement by Means of Stiffened Pins:

In industrial development projects a new core material has been developed that corresponds to the characteristics of the 48 kg/m³ honeycomb while saving 10% in weight. This new core comprises a light cellular carrier material that is reinforced by thin pins in order to improve its structural characteristics. The reinforcing semi-finished products are thin bar-shaped elements of any desired cross section, provided they comprise adequate inherent stiffness because otherwise they cannot be processed. The diameter of the pins used is between 0.279 and 0.711 mm Taking into account the respective materials characteristics the pins can be from any of the three materials categories, for example fibre-reinforced plastic, titanium alloys, glass, Nicalon or quartz. In the method developed, the pins are shot, with the support of ultrasound, into the cellular material, and in a second step they are transformed at the surface. The resulting product is marketed by the trademark of K-COR™. As an alternative to the above the pins can also enter the face layer. This product is commercially available by the name of X-COR™. This method provides a very considerable advantage in that the semi-finished reinforcement products can be manufactured in a separate process step as an endless product. Especially in the case of semi-finished bonded fibre fabrics, whose characteristics depend greatly on the fibre volume content and the fibre orientation, this is very positive. Designers thus have the option, by varying the local pin density, pin length, pin diameter and pin angle, to design a core that is optimal for each application. Possible angles range from vertical pins for component regions that are particularly strongly subjected to pressure, to angles between 20° and 30° for shear reinforcement.

Reinforcement by Means of Dry Semi-Finished Products:

Dry reinforcement of cellular materials is possible using various methods: sewing methods, winding-/braiding methods and stapling methods. The resulting products differ greatly both in the quality and in the flexibility of their reinforcement. Finishing of the dry-reinforced cellular material cores takes place in a subsequent infiltration process.

Sewing Methods:

There are two sewing methods that differ in principle: namely the single-face sewing methods with only an upper thread (e.g. tufting, blind stitching), and the double-face sewing methods comprising an upper thread and a bottom thread.

First we will discuss the double-face sewing methods. Generally speaking, various stitch types are known from textile processing. Examples include the lock stitch and the chain stitch.

Of these types of stitches the double lock stitch has been shown to be most suitable for reinforcing a cellular material. To form the double lock stitch an upper thread and a bottom thread are used in the textile industry, also referred to as needle thread and gripper thread. The needle thread is kept in the needle by means of the eye of the needle, which is situated in the tip of the needle, and is stitched through the component. During the reverse movement of the needle, the needle thread forms a loop that is gripped by the gripper tip. As a result of the rotational movement of the gripper the loop is enlarged and pulled around the gripper. In this process the needle thread loop is placed around the looper thread so that the latter is affixed. The position of the looping point is set by way of the thread tension. In the textile industry it is common, by means of identical upper thread and bottom thread tension, to position the knotting point in the middle of the goods to be sewn. In this way, among other things, an increase in the stretching ability of the seam is achieved. With the use of the double lock stitch in bonded fibre technology, this mid-point arrangement of the knot results in a host of undesirable side effects. Pulling the thread through the substrate increases the already arising undulation of the fibres in the placed scrim. However, since the interaction of bonded fibre fabric depends very strongly on the defined alignment of the fibres in the laminate, any interference, although unavoidable, is to be kept to an absolute minimum.

A further side effect refers to the sewing-together of bonded fibre fabric textiles; apart from fixing the individual layers such sewing-together also makes it possible to improve the interlaminar shear strength, i.e. reinforcement in the third dimension. The looping point is a weak point in this reinforcement and should therefore if at all possible be situated outside the effective region. For the reasons mentioned above, in bonded fibre fabric technology the looping point is placed to the bottom face of the laminate by increasing the bottom thread tension. As far as the yarns to be processed are concerned, it must be taken into account that during stitch formation the sewing thread is subjected to considerable friction loads and transverse loads. Consequently only yarns providing adequate flexural strength (for example Kevlar) can be processed without any problems. The use of rovings is possible only with extreme difficulties, or sometimes it is not possible at all. The described principle of creating a double lock stitch in a semi-finished textile product cannot be transferred without modifications to the reinforcement process of semi-finished cellular products, namely due to the high substrate height relative to textiles. For this purpose corresponding equipment was developed in corresponding research projects.

In an English sewing device, for example, the individual sewing needles are replaced by a needle bar by means of which several stitches can be made at the same time. The gripping system on the bottom face of the substrate is substituted by a principle from the field of projectile weaving looms. After stitching, the loops of the upper threads are opened up on the bottom face, and the bottom thread is shot through all the loops. Investigations have, among other things, been carried out on components that were reinforced by means of the double lock stitch. In the case of reinforced cellular materials the surface of a separated face sheet reduces considerably after the effect of an impact, wherein, depending on the stitch density, the damage visible from the outside is only slightly less than the inner damage. The amount of absorbed energy first increases until it decreases when the face sheet is perforated. Further investigations relating to the behaviour of cellular materials that were reinforced with the use of sewing techniques have shown that with this type of reinforcement there is an increase in the damage tolerance, as there is an increase in the nominal mechanical characteristics, but that the increase in weight is not insubstantial. Single-face sewing methods are associated with a very considerable advantage when compared to the already described double-face sewing methods in that the component needs to be accessible only from one face. Blind stitching and tufting are, for example, possible sewing methods.

Due to stitch formation, blind stitching is unsuitable as a reinforcement method. Tufting as a sewing method is related to double lockstitching, except that the bottom thread is replaced by a substrate, for example silicon, in which the formed loop is fixed when the needle is withdrawn.

PRESENTATION OF THE INVENTION

It is an object of the present invention to state improved manufacturing of reinforced cellular materials.

According to the present invention, apparatus for manufacturing a three-dimensionally reinforced cellular material and for taking up a semi-finished textile product in a hook is stated, as well as a system with the characteristics of the independent claims.

The present invention is implemented only in an exemplary manner with cellular materials providing the example, but it can also be applied to other fields. Furthermore, in the context of the present invention the term fibre bundle refers to rovings made from a multitude of non-twisted stretched individual fibres or monofilaments, individual fibres themselves, as well as threads that have arisen as a result of the twisting of individual fibres or fibre bundles. To the extent that in the context of the present invention reference is made to the thickness of a fibre bundle, this refers to the sum of all individual fibres in a compressed form.

Furthermore, the present apparatus according to the invention, the system and the method can, if required, also be used for manufacturing entirely different materials with reinforcement materials which are not classified as semi-finished textile products.

According to an exemplary embodiment of the present invention, apparatus for manufacturing a reinforced cellular material and for taking up a semi-finished textile product in a hook is stated. In this arrangement the apparatus comprises a first sub-unit with a transport device, as well as a second sub-unit with an uptake device. In this arrangement the transport device is equipped such that the semi-finished textile product can be conveyed into the uptake device. In contrast to this, the first sub-unit and the second sub-unit are equipped such that as a result of a relative movement of the first sub-unit relative to the second sub-unit the semi-finished textile product can be laid at defined length. The uptake device of the second sub-unit is further designed such that as a result of relative movement of the uptake device relative to the hook the semi-finished textile product can be placed in the hook.

The transport device, according to the invention, of the first sub-unit can be any apparatus that is able to transport the semi-finished textile product in a predetermined direction.

For example, the semi-finished textile product is to be inserted in the uptake device of the second sub-unit where, in a gap of the uptake device, it is to be placed in a hook, for example of a hooked needle. For example, such placement takes place after the hook has penetrated the material to be reinforced, or the cellular material to be reinforced. This transport device can thus be implemented, fir example, by means of so-called transport rollers, which in a manner so as to counter-rotate face each other so closely that a semi-finished textile product that is situated in the middle between the two rollers is transported by the surfaces of the rollers by means of frictional forces. Likewise, transport belts or individual mechanical grippers are also imaginable, which as a transport device transport the semi-finished textile product along the predetermined axis. It is the object of the transport of the semi-finished textile product to transport a defined length of the semi-finished product to the region behind the transport device in order to subsequently incorporate, in the reinforcing material, the desired quantity of semi-finished product either cut or uncut.

The relative movement of the first sub-unit relative to the second sub-unit in its principal significance refers to three different and independent movement variants of the apparatus. Firstly, it refers to movement in which the first sub-unit remains rigidly or firmly in its position while the entire movement is completed by a movement of the second sub-unit. Secondly, it is also possible for the second sub-unit to firmly remain in its position and for only the first sub-unit to move. The term relative movement also refers to a third option of movement, in which both the first sub-unit and the second sub-unit move, as long as in this manner, as is the case in all the other movement variants, the semi-finished textile product can be laid at defined length.

In this arrangement this and any other movement of the present invention can be generated by any desired drive means, for example by electrical, mechanical, pneumatic or hydraulic drive means.

In this arrangement the term defined length is to be interpreted such that, after conveyance of the semi-finished textile product into the uptake device and the relative movement of the first sub-unit relative to the second sub-unit, the position of the semi-finished textile product is adjusted when compared to the uptake device and consequently to the position at which the semi-finished product is later taken up. In this arrangement this predetermined length is most often determined by the required length of the semi-finished product in the material to be processed. In this context the material thickness and the insertion angle or placement angle at which the semi-finished product is to be laid up in the material for the purpose of reinforcement are important quantities.

The term relative movement in this exemplary embodiment of the invention is also used for the movement for placement of the semi-finished textile product in the hook. In this context, relative movement relates to the movement of the uptake device relative to the object that takes up the semi-finished textile product or the fibre bundle, thus for example the hook. This means that in a first case both the uptake device carries out the movement while the hook remains in its position, and the reversed variant is possible. In the context of the first case it should be noted that the semi-finished textile product is connected to the uptake device mechanically and in a force-transmitting manner so that the semi-finished textile product during movement of the uptake device moves along in the same direction and in the same orientation. Consequently, in the first case, placement of the semi-finished textile product in the hook or in any other desired device for taking up the semi-finished textile product is possible. However, the second case, too, in which the uptake device is at rest, and thus due to the mechanical connection the semi-finished textile product is also at rest, a movement of the hook towards the semi-finished textile product accomplishes uptake of the semi-finished product in the hook. However, a mixed form of these two variants is also possible, in which both components, namely the uptake device and at the same time also the hook, move so that the semi-finished textile product is placed in the hook.

Thus this exemplary embodiment of the present invention is able to make a hole in the cellular material before the fibres are pulled into the cellular material. For this reason the system according to the invention can improve reinforcement of cellular materials with fibres to the effect that essentially the incorporated fibres are responsible for improving the mechanical characteristics of the cellular material core, rather than the resin, which in subsequent infiltration processes flows into the excessively large holes around the fibres, being responsible for the aforesaid.

The present apparatus according to the invention is thus in a position to implement the advantages of fibre-reinforced cellular materials, without there being a need to accept the hitherto associated disadvantages.

According to a further exemplary embodiment of the present invention, the apparatus furthermore comprises at least one cutting implement that is equipped such that the semi-finished textile product can be cut to the defined length.

The invention is based on the idea that the fibre bundles for reinforcement of a cellular material are not incorporated at the same time during the production of the holes in which the fibre bundles are finally to be present in a directed manner, but instead to firstly provide the cellular material with a through hole from a first surface in the direction of a second surface, and then subsequently to pull a piece of a semi-finished textile product or a fibre bundle, which has been provided on the other side of the second surface, into the through-hole in the direction of the first surface. This applies to the present exemplary embodiment and to all the other exemplary embodiments of the apparatus according to the invention.

This object is to be further supplemented by the option, by local variation of the semi-finished product density or the pin density and of the angle in which the semi-finished products are incorporated in the cellular material, to tailor the mechanical characteristics of the structure to the particular application and to locally required mechanical characteristics. This is possible only to a limited degree if the seam is to remain closed. For this reason, the apparatus according to the invention, as is the case in this exemplary embodiment, can comprise at least one cutting implement for cutting the semi-finished textile product to length. In this process the required length of the semi-finished product is determined by the individual requirement, for example by the thickness of the cellular material to be reinforced, and by the pull-in angle of the semi-finished product into the cellular material.

If special semi-finished textile products are to be used in the apparatus according to the invention, the cutting of which semi-finished textile products requires special cutters, then these special cutting implements are possible as exemplary embodiments. Apart from mechanical cutters with sharp knife-like blades, it is also possible to use cutting implements that apply separation processes resulting from heat, ultrasound, cutting by means of an electrical current or by means of light.

According to a further exemplary embodiment of the present invention, the cutting implement is attached to the first sub-unit.

This exemplary embodiment of the apparatus according to the invention is, for example, shown in FIG. 1, whose first sub-unit 6 comprises, for example, two cutting tools 2. These are mechanical cutting implements with blades, wherein the above-mentioned more specialised cutting implements cannot be excluded as possible cutting implements.

According to a further exemplary embodiment of the present invention, the hook is provided on a so-called hooked needle.

In this context the term hooked needle refers to a sewing device which is, for example equipped to pull fibre bundles into a cellular material. For example, sewing devices are known that are used in particular in the field of manufacturing sandwich constructions. Such sandwich constructions comprise, for example, cellular materials that can be reinforced by carbon fibres or by other bonded fibre fabrics. In order to render the apparatus according to the invention technically compatible for this very case of manufacture, a so-called hooked needle is used in such a sewing device. Such a hooked needle is shown in an exemplary manner in FIGS. 5a and 5b, wherein this hooked needle can additionally comprise a closure mechanism.

According to an exemplary embodiment of the present invention, the apparatus further comprises pneumatic drive means, wherein these pneumatic drive means are equipped to generate at least one of the two relative movements.

In this context the term pneumatic drive means refers both to the means for generating compressed air and to the conveyance of compressed air by means of compressed-air lines to corresponding movement components including seals and nozzles.

According to a further exemplary embodiment of the present invention, the uptake device further comprises a vertical gap. In this arrangement the vertical gap is equipped such that the hook can be inserted into the gap. Furthermore, the relative movement of the first sub-unit relative to the second sub-unit can be implemented such that after this relative movement has been carried out the middle of the semi-finished textile product is located in the middle of the gap.

The term middle of the semi-finished textile product is illustrated in FIG. 2c. Thus the middle of the semi-finished textile product is measured from the position at which the semi-finished textile product will at a later stage actually or possibly, depending on requirements, be cut by the cutters or the cutting implement. The part of the semi-finished textile product, which part in FIG. 2c is to the left-hand side of the cutters, is equal to the entire length of the part of the semi-finished product, which part is subsequently in a further step taken up and placed in the material to be reinforced. The relative movement of the first sub-unit relative to the second sub-unit is then completed such that the distance from the possible cutting implements 2 to the middle of the gap of the uptake device is precisely equal in length to the distance from the middle of the gap to the end of the semi-finished textile product.

When the semi-finished textile product is taken up in a hook precisely at the location of the middle of the gap, and when the semi-finished textile product is subsequently pulled into a cellular material to be reinforced, the above ensures that at each position of a hole in the cellular material the fibre density is the same.

The loop which forms during uptake in the hook from the piece of the semi-finished product around the hook thus has two ends that are equal in length.

According to an exemplary embodiment of the present invention, the apparatus comprises at least one transport roller as a transport device.

In this arrangement these transport rollers make possible steady and continuous mechanical transport of the semi-finished textile product into the uptake device. The transport rollers are, for example, clearly shown in FIG. 1 and designated by the reference character 1. Furthermore, FIGS. 2a-f illustrate in a top view the function and significance of the rollers for prewinding the semi-finished textile product or the roving. In order to provide the semi-finished textile product that at a later stage can be inserted as reinforcement in the cellular material at a suitable length and in the middle at the position of uptake by the hook, the rollers handle prewinding of the semi-finished product. In combination with positioning the middle of the gap relative to the middle of the part of the semi-finished product, which part is located within the apparatus according to the invention, prewinding of the roving or of the semi-finished product makes it possible to provide the semi-finished textile product at a predefined length at the location at which said semi-finished textile product is at a later stage taken up by a hook. In this context the term "the part of the semi-finished product, which part is located within the apparatus according to the invention" refers to that part of the semi-finished product which, for example, in FIG. 2c is situated to the left-hand side of the cutting implement. This starting point for measuring the length of the semi-finished product within the apparatus according to the invention is selected because in some exemplary embodiments the length of the semi-finished product to be processed is determined by the cutters during a cutting process.

According to a further exemplary embodiment of the present invention, a system for manufacturing reinforced materials is stated, which system comprises a bottom and a top partial system. In this arrangement the material to be reinforced can be placed between the two partial systems, wherein the bottom partial system comprises apparatus according to a preceding exemplary embodiment of the invention. In contrast to the above, the top partial system comprises a needle bar drive and/or a tufting sewing machine.

The invention is based on the idea that the fibre bundles for reinforcement of a cellular material are not incorporated at the same time during the production of the holes in which the fibre bundles are finally to be present in a directed manner, but instead to firstly provide the cellular material with a through-hole from a first surface in the direction of a second surface, and then subsequently to pull a fibre bundle, which has been provided on the other side of the second surface, into the through-hole in the direction of the first surface.

In this arrangement the semi-finished textile product corresponds to the fibre bundle, and the provision of the semi-finished textile product on the other side of the second surface is accomplished by the bottom partial system, i.e. apparatus according to one of the preceding exemplary embodiments of the invention. In contrast to the above, the production of the holes in which the fibre bundles or the semi-finished textile product is finally to be present in a directional manner, and the concurrent approach of the hook to take the semi-finished textile product up to the uptake device, are ensured by the top partial system, for example a needle bar drive.

Since this system according to the invention is able to implement a single-face sewing method, and since the hook or the hooked needle does not generate a hole in the cellular material and pull the fibre into the cellular material at the same time, the system according to the invention can improve reinforcement of cellular materials with fibres to the effect that essentially the incorporated fibres are responsible for improving the mechanical characteristics of the cellular material core.

In order to make it possible, by means of the top partial system, to sew through the material to be reinforced, the material can both be placed and attached between the two partial systems. The through-holes that are generated by the needle bar drive can be incorporated in the cellular material at any desired angular position.

The above also applies to all the apparatus mentioned above.

The orientation of the through-holes can, in particular, be individually adjusted to the respective form of the cellular material to be reinforced, as well as to the load situations to be expected in operation. The system makes it possible to tailor a core structure to a specific load case and application case.

According to a further exemplary embodiment of the present invention, the system according to the invention further comprises a transport mechanism for transporting the material to be reinforced, wherein the transport mechanism is designed such that the material can be transported in predetermined steps between the two partial systems.

In order to be able to incorporate reinforcements at various locations within the cellular material in the plane of the cellular material, the material needs to be positioned, by means of the transport system or the transport mechanism, between the two partial systems so that when a through-hole in the cellular material is made, the desired local position can be provided with a semi-finished textile product at the desired angular position. In this arrangement various patterns as desired can be sewn that make it possible to tailor the local mechanical characteristics of the core structure to a specific load case or application case. In this context it is of decisive importance that by means of the cutting implement the semi-finished textile product can be cut to length after each work step so that there is no closed seam extending over a larger spatial region of the material, and thus the density of the pins within the material can be locally varied right down to the smallest local units.

In this arrangement the predetermined steps of the transport mechanism can be predefined or carried out by a software program or a control unit.

According to a further exemplary embodiment of the present invention, the system further comprises at least one computer unit for controlling the apparatus according to the invention, the transport mechanism and/or the top partial system according to the invention.

In order to make it possible for the procedure of prewinding the semi-finished textile product to be carried out by the transport device, and in order to be able to control at least one of the relative movements of the apparatus according to the invention, a computer unit is stated in this exemplary embodiment. Furthermore, the computer unit can control the transport mechanism which moves the cellular material to the appropriate local position that is to be reinforced.

However, the top partial system according to the invention, which partial system comprises a needle bar drive, can also be controlled by the computer unit according to the invention.

It is thus possible, by means of the system according to the invention, to implement a fully automated and computer-controlled process unit that fully automatically implements the manufacture of a reinforced cellular material and the uptake of a semi-finished textile product in a hook.

According to a further exemplary embodiment of the present invention, a method for taking up semi-finished textile products in a hook for reinforcing materials is stated, wherein the method comprises the following steps: laying the semi-finished product onto the bottom face of the material to be reinforced, positioning the middle of the semi-finished product at the location of uptake, inserting the hook into the material to be reinforced, placing the semi-finished material in the hook, and withdrawing the hook with concurrent positioning of the semi-finished product in the material to be reinforced.

In order to implement a single-face sewing method in which generating the through-holes in the material is not carried out at the same time with the feed-through of the reinforcing material, in other words with the pins, the above method-related steps according to the invention are stated. In this arrangement FIGS. 2a to f describe that part of the method that happens on the bottom face of the material to be reinforced. The diagrams thus show the semi-finished textile product during prewinding of a roving, as well as positioning of the middle of the semi-finished product to the location of the subsequent uptake. Insertion of the hook into the material to be reinforced can, for example, be accomplished by the top partial system according to the invention and is, for example, carried out with a special sewing device that is intended for pulling fibre bundles into a cellular material. Placing the semi-finished product in the hook can, for example, be implemented by a relative movement of the hook relative to the semi-finished textile product. In order to lay the semi-finished textile product up in the material to be reinforced the hook is withdrawn through the material, wherein subsequently the semi-finished textile product or the fibre bundle is released from the hook. In this process the initial situation of the method is reached, wherein the term "initial situation" in this context does not relate to the state of the already processed material, but instead describes the state and the situation of the apparatus that implements the method. After this initial situation has been reached, the method can thus be started and implemented anew and in the initial state of the apparatus.

A continuously repeated variant of the method according to the invention, which variant can be applied locally to the cellular material with different density, makes it possible to reinforce cellular materials over a large area but in a locally differentiated manner, and in this process to reduce the hole size during pulling the semi-finished textile product into the cellular material. Thus, based on the method according to the invention, it is possible to obtain a sandwich construction with a high-resistance cellular material core that retains thermal and acoustic insulation advantages and manufacturing advantages when compared to honeycomb structures, and in addition, as a result of the method according to the invention, comprises improved mechanical characteristics when compared to conventional cellular materials or conventional reinforced cellular materials.

According to a further exemplary embodiment of the present invention, a method is stated which comprises the additional following step: releasing the semi-finished textile product from the hook.

In order to locally lay up individual limited pieces of the semi-finished textile product in the cellular material and in doing so to locally achieve different pin densities, the respective pieces of the semi-finished textile product have to be prepared to length, for example cut off, before they are incorporated in the material to be reinforced. After the reinforcements have been prepared and laid up in the material to be reinforced, the semi-finished textile product must be released by the hook. Thereafter, the hook, at another position of the cellular material to be reinforced, can again through the entire process lay up a fibre bundle or a piece of semi-finished textile product. In this arrangement the process or process step of releasing can, for example, take place by cutting with the use of scissors or with any desired electrical, thermal or mechanical cutting implement. However, opening the loop, which has formed in the method according to the invention from the semi-finished textile product around the hook, for example of a needle, can be opened. This opening process takes place at the top of the material to be reinforced, because the semi-finished product has already been taken up on the bottom of the material to be reinforced and has subsequently been pulled through the material. However, it is also possible to open the hook so that the semi-finished textile product is released, for example, by gravitation or by pulling the semi-finished product in the direction of release.

According to a further exemplary embodiment of the present invention, the method comprises the following additional step: by means of a cutting implement, cutting the semi-finished textile product at a defined length at the bottom face of the material to be reinforced.

Like the preceding step of releasing the semi-finished textile product from the hook, this additional process step is also necessary in order to be able to produce a locally varying pin density and thus to tailor the mechanical characteristics of the cellular material. In this process the cutting implements can be mechanical cutters, or, as an alternative, cutting technologies that operate with the use of electrical, optical or thermal techniques are possible for use as cutting implements. Since the semi-finished textile product is provided underneath the cellular material in order to pull said semi-finished textile product through the cellular material partly to the surface, cutting the semi-finished textile product is, for example, carried out at the bottom of the cellular material.

According to a further exemplary embodiment of the present invention, the hook is situated on a hooked needle, and the semi-finished product is placed in the hook by means of a relative movement of the semi-finished product relative to the hooked needle.

According to a further exemplary embodiment of the present invention, the process steps are carried out repeatedly, and a closed seam arises as a result of omitting to cut the semi-finished textile product.

Should it be advantageous for a special application to produce a closed seam in a certain region of the cellular material, then the method according to the invention, as a result of omitting to activate the cutting implement, can lay up one and the same piece of the semi-finished textile product in multiple lengths of the otherwise used piece of semi-finished product in the cellular material and in this way produce a long closed seam.

According to a further exemplary embodiment of the present invention, the semi-finished product is a fibre bundle, wherein the fibres of the fibre bundle are laid up so as to be parallel and stretched in the material to be reinforced.

For example, this hook can be affixed to a needle with a hook-like tip. Said hook grips the roving or the semi-finished textile product in the middle on the bottom face of the material and pulls said roving through the cellular material. As a result of folding, a large number of fibres are pulled into the cellular material where they are present so as to be parallel and stretched.

According to a further exemplary embodiment of the present invention, the use of a reinforced cellular material in an aircraft is stated, which cellular material has been manufactured with the apparatus according to the invention, the system according to the invention, or the method according to the invention.

According to a further exemplary embodiment of the present invention, an aircraft comprising a reinforced cellular material is stated, which cellular material has been manufactured with the apparatus according to the invention, the system according to the invention, or the method according to the invention.

The exemplary embodiments of the apparatus and of the system apply to the method and vice versa.

With the present invention, apparatus is created that can be used in particular in the field of manufacturing sandwich constructions. Sandwich constructions comprise, for example, cellular materials that can be reinforced by carbon fibres or other bonded fibre fabrics.

Further exemplary embodiments and advantages of the invention are shown in the following description of the figures.

Partial aspects of the method are disclosed in the U.S. provisional application U.S. 60/685,296, which is herewith completely incorporated by reference.

BRIEF DESCRIPTION OF THE DRAWINGS

The illustrations in the figures are diagrammatic and not to scale.

Figure 1:
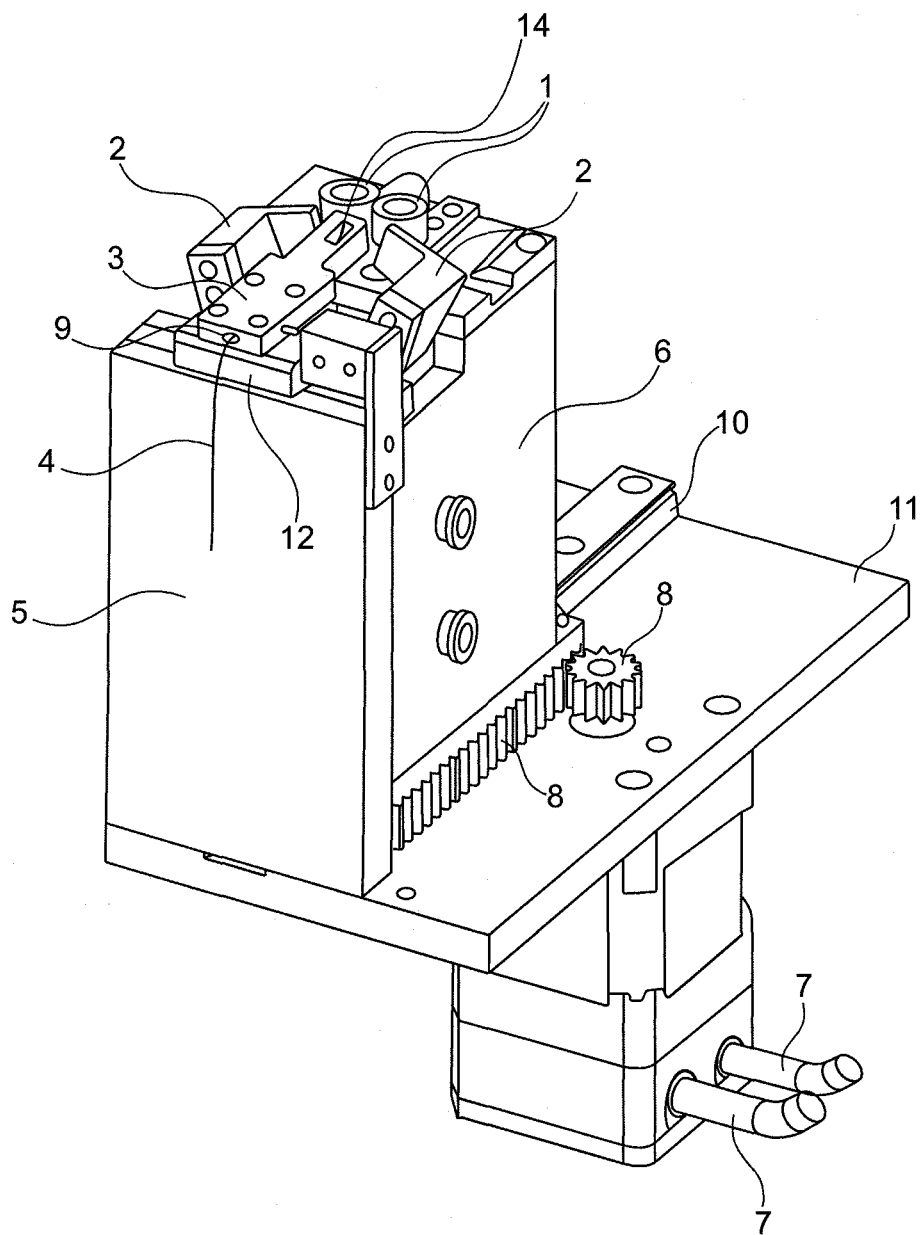
FIG. 1 shows a diagrammatic three-dimensional view of the apparatus according to the invention for manufacturing a reinforced cellular material and for taking up a semi-finished textile product in a hook according to an exemplary embodiment of the present invention.

Below, preferred exemplary embodiments of the present invention are described with reference to the figures.

In the following description of the figures the same reference characters are used for identical or similar elements.

The following explanations provided also apply to an aircraft comprising a reinforced material that has been produced with the apparatus according to the invention, the system according to the invention, or the method according to the invention. The explanations also apply to the use of a reinforced cellular material in an aircraft, wherein the cellular material has been manufactured with the apparatus according to the invention, the system according to the invention or the method according to the invention.

FIG. 1 shows a diagrammatic three-dimensional view of an exemplary embodiment of the apparatus according to the invention. The drawing shows a first sub-unit 6 with a transport device 1, wherein the transport device 1 in the present embodiment comprises, for example, transport rollers 1. Furthermore, the second sub-unit 5 is shown, wherein in the present embodiment it is a vertical unit that is firmly affixed to a base plate 11. In contrast to this, in this exemplary embodiment the first sub-unit 6 can move in a linear manner along the linear axis 10, which movement is handled by a mechanical drive 8. In this arrangement the relative movement need not be carried out on a linear axis as shown, but instead it can move along three-dimensional curves as desired.

In an exemplary embodiment the movement can be implemented by means of pneumatics with corresponding compressed-air supply lines 7. However, in principle, any electrical, hydraulic or mechanical drive to generate the relative movement between the first sub-unit and the second sub-unit is possible. In this embodiment it is thus the case that the second sub-unit 5 does not move, whereas the relative movement between the two sub-units is caused by the first sub-unit 6. In this exemplary embodiment this first sub-unit is shown as a slide on the linear axis. In order to ensure that the semi-finished textile product is cut to length, in an exemplary manner two mechanical cutters 2 are shown that are in place on the first sub-unit. If the semi-finished textile product has been laid in a corresponding length by means of transport rollers 1, and if by means of the relative movement between the first and the second sub-units the future middle of the semi-finished textile product has been positioned to the middle of the gap within the uptake device 14, then the semi-finished textile product can be cut to length. Only in this way is it possible to affix the individual pieces of the semi-finished textile product, in other words individual fibre bundles or individual rovings, individually and in a targeted manner at positions within the cellular material. The uptake device 3 with its gap 14 comprises a channel 9 for the semi-finished textile product 4 so that the semi-finished product can be placed in through the uptake device by means of the transport rollers. As shown in FIG. 1, the end may protrude freely from the uptake device 3.

In the above arrangement it is particularly significant that the variant of the transport device, the variant of the cutting implement, the variant for generating the relative movement between the first and the second sub-units, as well as the variant for generating the relative movement between the uptake device and the hook are selected as examples, and according to preceding paragraphs of the present description are possible in other embodiments.

The relative movement 13 between the uptake device 3 and the hook can in this case, for example, be effected by the slide 12 for transverse movement of the uptake device 3. This would correspond to a relative movement in which only the uptake device moves while the hook (not shown in the diagram) is at rest.

By means of the apparatus according to the invention shown in FIG. 1 the basic idea of the invention can be implemented. By means of the apparatus according to the invention a situation can thus be achieved in which improvement of the mechanical characteristics of cellular materials is implemented by the fibres, as desired, rather than essentially being implemented by the incorporated resin as is the case in hitherto known methods.

In order to be able to manufacture such an improved cellular material with the apparatus according to the invention in an automated process, the following individual steps are carried out by the apparatus according to the invention, which apparatus is shown in FIG. 1: lay the rovings at a defined length, cut the rovings, place the rovings in the middle into the needle and open the loop in the needle at the top. In process automation the individual functions, in the present embodiment in FIG. 1, are implemented as follows. The entire functional unit comprises two sub-units. The first sub-unit 6, shown as a slide, moves on the base plate 11 by means of a linear axis 10, wherein the second sub-unit 5, shown as a vertical unit, is rigidly installed on the base plate. In the first step the rollers 1 convey the roving 4 forward to the desired length. In this process the textile product is threaded through the uptake device 3, while its other end can hang down freely. In the next step the slide 6 moves along the linear axis by a distance required for the middle of the roving to be situated exactly in the middle of the gap of the uptake device 3. When the roving is positioned, the hooked needle penetrates the substrate and on the substrate bottom encounters the gap of the unit 3 or the uptake device 3. In order to thread the roving into the hook the uptake device 3 is arranged on a slide 12 which, for example pneumatically driven, can make a sideways movement. When the hook is in the gap, the opening points to the side on which the roving was laid. In this context the term opening refers to an opening of the hook in order to make it possible at all to place the roving in the hook. For example, this hook can also be provided by opening an otherwise closed hook. If the small slide then makes a sideways movement towards the needle, then the roving is placed into the hook. Before the needle makes a reverse movement the roving is cut to length by means of the cutters or the cutting implement 2.

The following FIGS. 2*a* to *f* show various states of the apparatus according to the invention during implementation of the method according to the invention for manufacturing a reinforced cellular material and for taking up a semi-finished textile product in a hook.

Figure 2A:
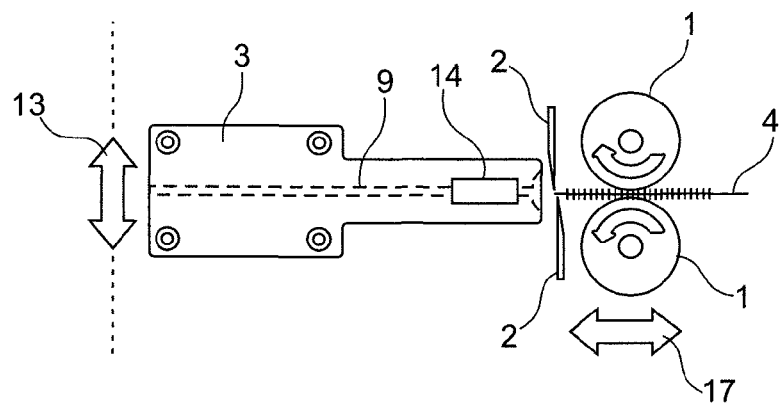
FIGS. 2a-2f show diagrammatic two-dimensional views of the apparatus according to the invention for manufacturing a reinforced cellular material and for taking up a semi-finished textile product in a hook according to an exemplary embodiment of the present invention.

FIG. 2*a* shows a diagrammatic two-dimensional view of an exemplary embodiment of the apparatus according to the invention. In this arrangement the apparatus is shown in top view. The transport device is shown in an exemplary manner as transport rollers 1, which moves the semi-finished textile product 4 into the channel for the semi-finished textile product 9 within the uptake device 3. The gap within the uptake device 14 later ensures the volume region in which the hooked needle can take up the roving or the semi-finished product. In this arrangement FIG. 2*a* shows the initial situation of the method according to the invention by means of the apparatus according to the invention. In this arrangement the arrow 17 shows the direction of the relative movement of the first sub-unit relative to the second sub-unit, wherein in the present embodiment the cutters 2 in an exemplary manner are designed as a mechanical cutting implement.

Figure 2B:
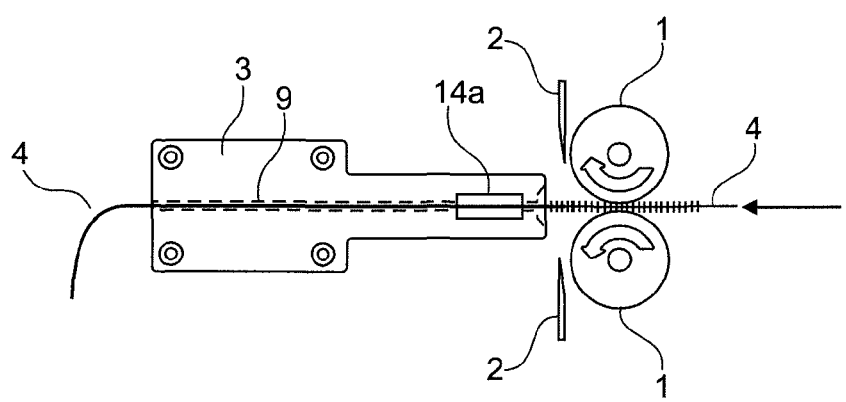

FIG. 2*b* shows the state of the apparatus according to the invention in the implementation of the method according to the invention, wherein in this process step prewinding of the semi-finished textile product by means of the transport rollers 1 is shown. The diagram clearly shows the semi-finished textile product 14*a* in the gap of the uptake device. By prewinding the semi-finished product the channel 9 for the semi-finished textile product in the uptake device 3 is full, and the end of the semi-finished textile product 4 hangs down freely on the left-hand side of the figure.

Figure 2C:
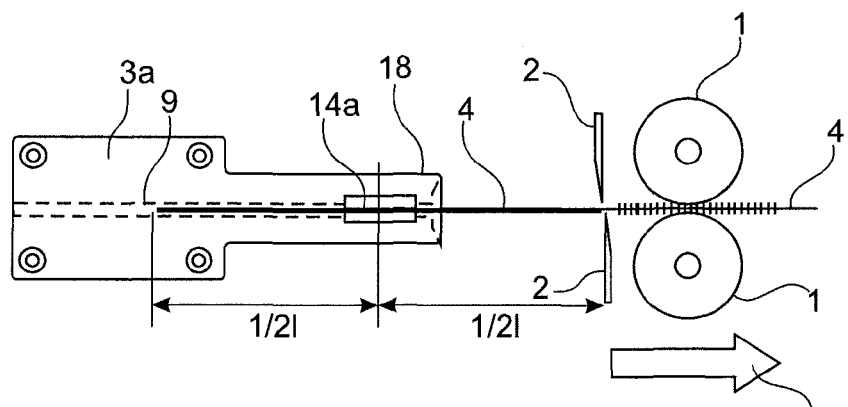

FIG. 2*c* shows a two-dimensional diagrammatic view of the apparatus according to the invention during the process step in which the relative movement between the first sub-unit and the second sub-unit has moved to such an extent that the middle of the semi-finished product is situated exactly in the middle of the gap of the uptake device 14. In a subsequent step, the middle of the gap 18 will be the location at which the hook takes up the semi-finished textile product. In this arrangement the arrow 17 indicates the direction of the relative movement of the first sub-unit relative to the second sub-unit. This involves, or at least does not preclude, the possibility of all three options of the movement type, namely movement of the first and the second sub-units; movement of the first sub-unit only; or movement of the second sub-unit only.

FIG. 2*c* clearly shows that that part of the semi-finished textile product that is situated on the left-hand side of the cutters or of the cutting implement 2 has been positioned by the relative movement precisely such that the middle of the semi-finished product 4 coincides precisely with the middle of the gap 14*a* or 18. This ensures that after uptake of the semi-finished product by the hook, even distribution of the textile material within the cellular material is ensured.

Figure 2D:
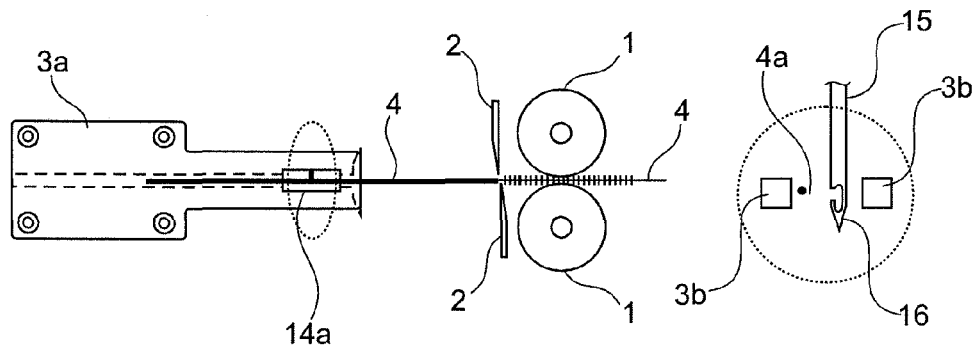

FIG. 2*d* shows a diagrammatic two-dimensional view of the apparatus according to the invention in the implementation of the method according to the invention. FIG. 2*d* shows the step of inserting the needle 15 that comprises a corresponding hook 16. The left-hand region of the drawing 2*d* shows a top view of the apparatus according to the invention with the transport rollers 1 and the semi-finished product 4 as well as the cutters 2. On the right-hand side of FIG. 2*d* there is a magnified view of that area in which the gap of the uptake device 3 is located. This right-hand region of FIG. 2*d* shows this gap including the needle with the hook 15 and 16 as well as the uptake device 3*b* in cross section. Likewise, the right-hand part of the figure shows the semi-finished textile product in cross section 4*a*. In this situation, in which the needle has made a hole through the cellular material situated above it, and for the purpose of uptake has entered the gap of the uptake device, the needle 15 with the hook 16 is still some distance away from the textile fibre. It is only as a result of a subsequent relative movement that the fibre can be placed in the needle 15.

Figure 2E:
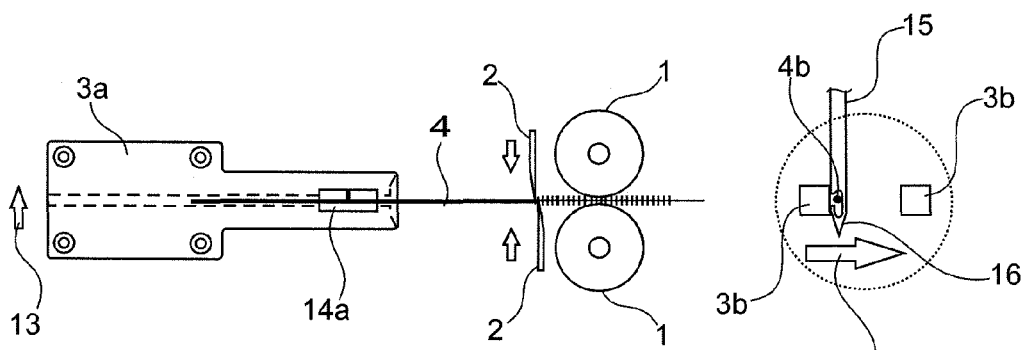

Just like the previous FIG. 2*d*, FIG. 2*e* shows a top view of the apparatus according to the invention on the left-hand side, and the cross section of the gap of the uptake device 3 on the right-hand side. In this arrangement the left-hand side shows that as a result of the relative movement of the uptake device 3 relative to the hook or the hooked needle 15, indicated by the arrow 3, placement of the textile in the needle or in the hook can take place. In this arrangement the uptake device is shown in cross section 3*b*; said uptake device quasi serves as a resistance in the placement of the semi-finished product 4*b*. Due to the contact pressure, which results from the uptake device 3 that in the present diagram is shown in cross section, the semi-finished textile material is pressed into the opening of the needle 15. In this context it is also of decisive importance that the relative movement allows all three options of movement of the uptake device and of the hook. Once the semi-finished product has been placed in the hook, then by means of the cutters 2 the roving or the semi-finished textile product can be cut to length. Thereafter the needle can make a reverse movement and place the roving or the semi-finished textile product into the cellular material to be reinforced. At the top (not shown in the diagram) of the material, release b or undoing of the loop takes place, which loop has formed from the reinforcement material around the hook.

Figure 2F:
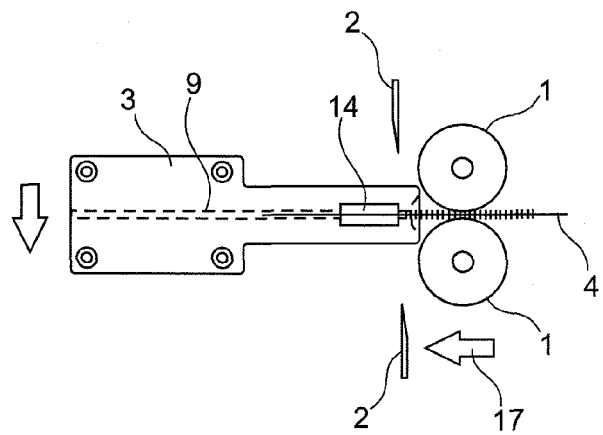

FIG. 2*f* shows a diagrammatic two-dimensional top view of the apparatus according to the invention. In this arrangement the two arrows indicate the corresponding counter movements to the previously made relative movements in order to reach the initial situation after withdrawal of the needle. Thereafter, the first step, according to the invention, of the method can be repeated after the position of the material to be reinforced has been changed.

Figure 3:
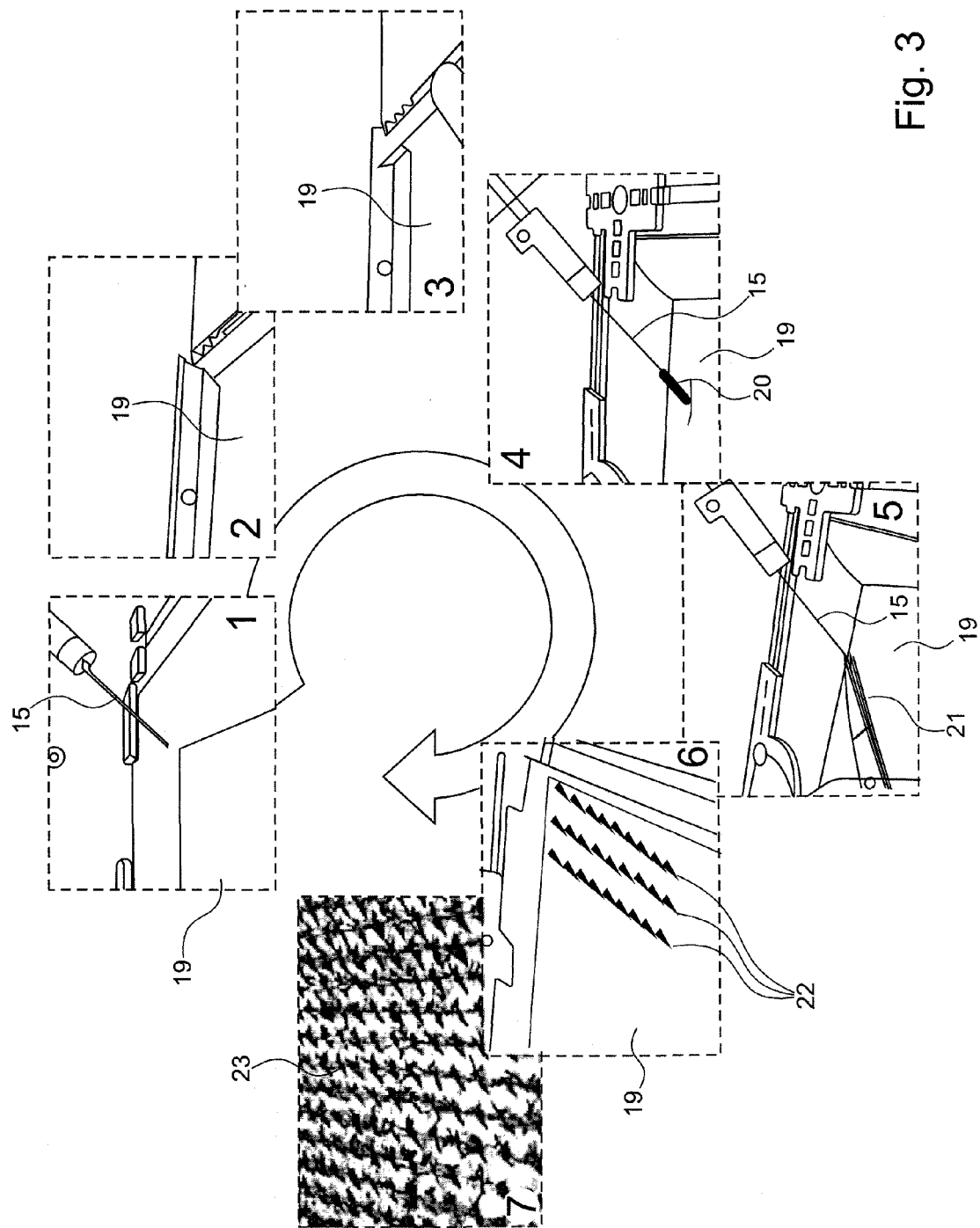
FIG. 3 shows a diagrammatic three-dimensional view of the method according to the invention by means of apparatus according to the invention or a system according to the invention.
Figure 4:
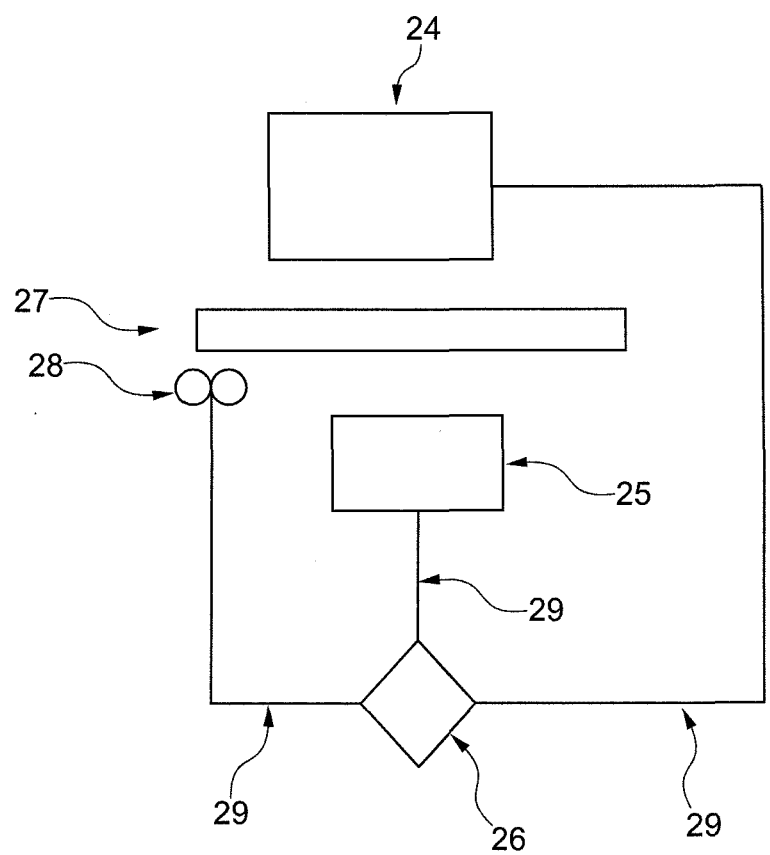
FIG. 4 shows a diagrammatic two-dimensional view of the system according to the invention according to an exemplary embodiment of the present invention.

FIG. 3 shows a diagrammatic three-dimensional view of the method according to the invention according to the apparatus according to the invention or the system according to the invention. In this arrangement, in seven successive images, individual steps are shown, viewed from the top of the cellular material. The needle 15 is shown, which is still at the top of the cellular material. The cellular material 19 is rectangular in shape and is to be reinforced with a semi-finished textile product at predetermined locations. Sub-FIG. 4 shows that after insertion of the needle 15 in the cellular material 19 during withdrawal of the needle within the previously generated hole a hooked-in semi-finished textile product, having been fed through the cellular material, exits at the top of the cellular material. The subsequent sub-FIG. 5 shows a pair of scissors for manually cutting the semi-finished textile product detaching the semi-finished textile product from the hooked needle 15. The next sub-FIG. 6 shows various fed-through pieces of semi-finished textile product, wherein these pieces have been placed through the cellular material in three parallel rows. The next and last sub-FIG. 7 shows an enlargement of the cellular material 19 in which the complete cellular material comprises regularly reinforced positions after all the pieces of semi-finished textile product have been worked in.

FIG. 4 shows a diagrammatic two-dimensional view of the system according to the invention for the production of reinforced materials. The diagram shows a top partial system 24 and a bottom partial system 25, and between them a middle unit 27 for supporting the material to be processed. In order to be able to position this material to be processed as far as the insertion point, which is defined by the upper unit 24, is concerned, a transport mechanism 28 for the middle unit is provided. In this arrangement a computer unit 26 is in a position to control the transport mechanism of the middle unit. Furthermore, the upper and the lower units or the top and the bottom partial systems are completely automatically controllable by lines from the computer unit to the respective units to be controlled. In this arrangement the upper partial system can comprise a needle bar drive, while the bottom partial system can be apparatus according to the apparatus according to the invention. By means of the system shown in FIG. 4 it is thus possible to manufacture reinforced cellular materials completely automatically, wherein even locally varying pin densities can be implemented by the system according to the invention.

Figure 5B:
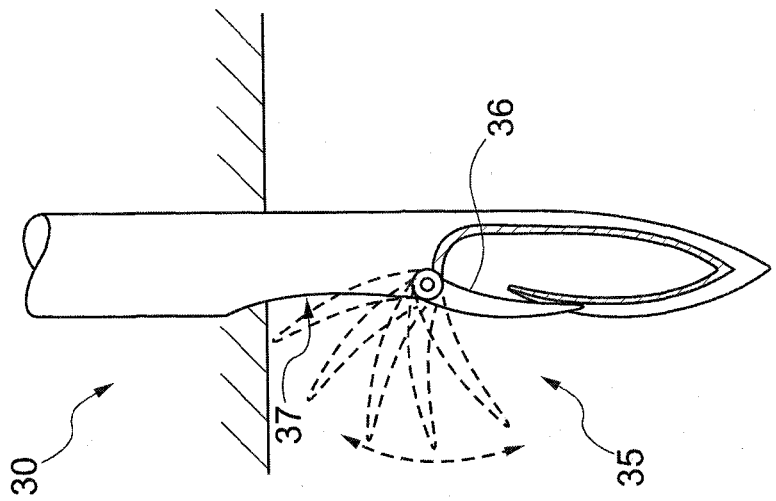
FIGS. 5a and b show a diagrammatic three-dimensional view of a hooked needle that can be used in the present invention.
Figure 5A:
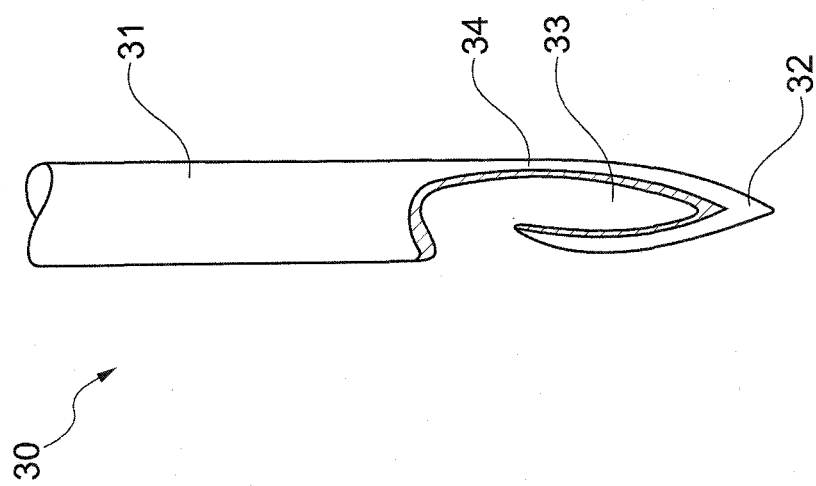
Figure 6:
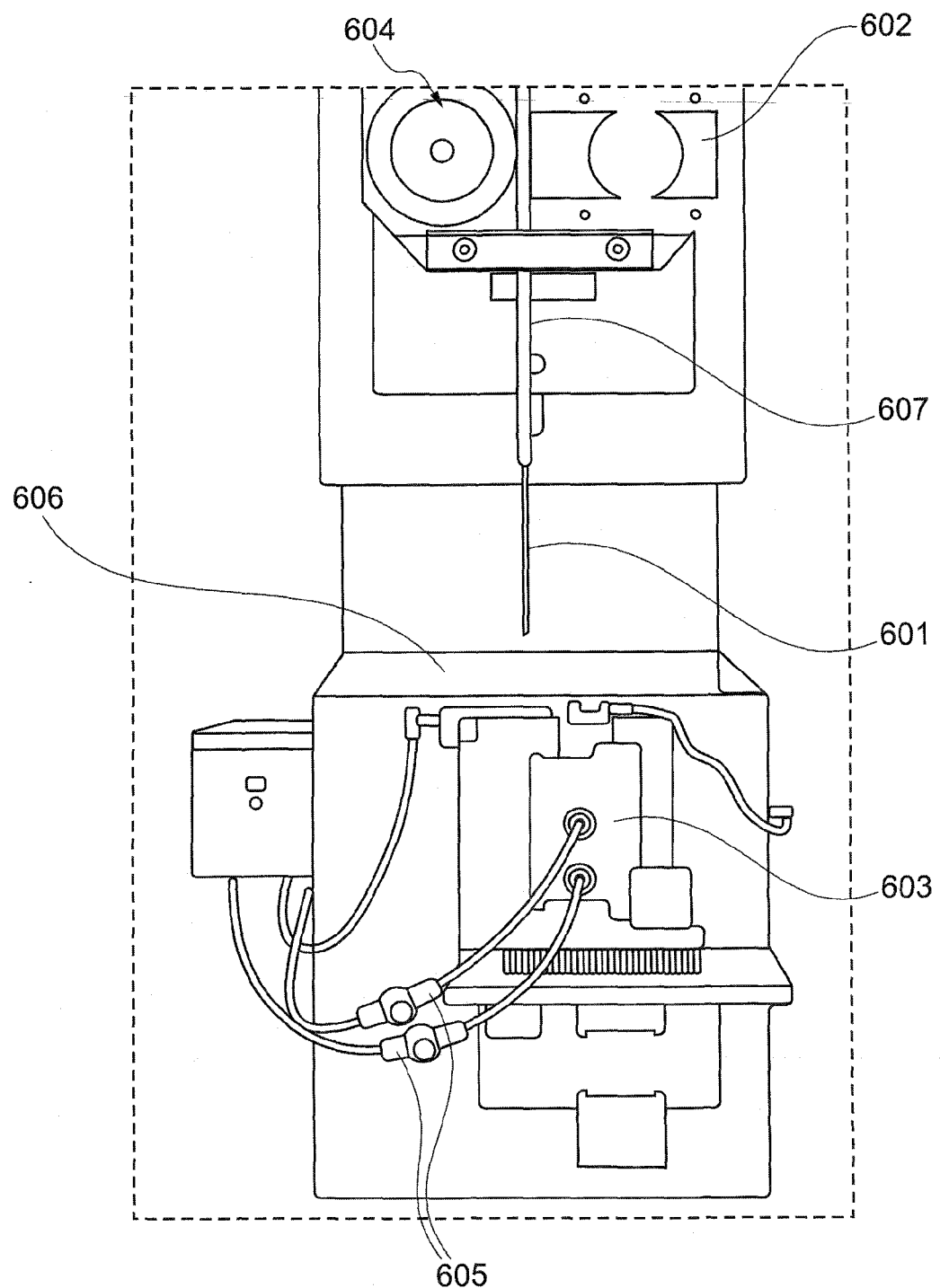
FIG. 6 shows a diagrammatic three-dimensional view of a top partial system according to an exemplary embodiment of the present invention.

FIGS. 5a and 5b show two needles of different designs by means of which needles the method according to the invention can be implemented in an exemplary manner, or which needles can be used for utilising the apparatus according to the invention. FIG. 5a shows a first embodiment of a hooked needle 30 that comprises a straight-line shaft 31 whose front tapers to form a point 32. In the region of the point 32 the needle 30 comprises an eyelet 33, which, however, comprises an opening on one side so that through it a fibre bundle can be inserted in the eyelet region of the needle 30.

The hooked needle 30 shown in FIG. 5b essentially corresponds to that shown in FIG. 5a, except that in addition to the hooked needle 30 shown in FIG. 5a it comprises a closure mechanism 35 that is designed to close the opening of the eyelet 33 during pulling-out of the hooked needle 30 from a cellular material. The closure mechanism 35 essentially comprises a flap 36 that in its initial position comes to rest in a tapered region 37 at the shaft of the needle 30. As soon as the free end of this flap 36 during the pulling-out of the needle from the cellular material contacts said cellular material, said flap 36 moves clockwise from its initial position to a position in which it completely closes the opening of the eyelet 33, as shown in FIG. 5b. This avoids a situation in which when the needle 30 is withdrawn from the cellular material the hook end of the second limb damages the interior wall of a through-hole in the cellular material. Furthermore, the closure mechanism 35 ensures that no fibres become detached from the fibre bundle during pulling-in into the cellular material. If the cellular material, including already applied cover layers, is perforated, the closure mechanism 35 prevents a situation in which, on the way back, fibres from the textiles are gripped by the needle 30 and are pulled into the interior of the hole.

FIG. 6 shows a diagrammatic three-dimensional view of a system 600 according to the invention, with a top partial system 602 and a bottom partial system 603. In this arrangement the needle 601, which after penetration into the material to be reinforced takes up the semi-finished textile product in the bottom partial system 603, is affixed to the rod 607. This rod forms part of the needle bar drive 604. Furthermore, supply lines for the drive of the lower partial system 605 are shown. The region between the top and the bottom partial system, into which region the material for reinforcement is incorporated, is designated 606.

LIST OF REFERENCE CHARACTERS

1 Transport rollers
2 Cutters
3 Uptake device
3a Uptake device in positioning location
3b Cross section of uptake device 3
4 Semi-finished textile product
4a Cross section of semi-finished textile product
4b Placed semi-finished textile product
5 Second sub-unit
6 First sub-unit
7 Connections for the control system
8 Drive mechanism
9 Channel for the semi-finished textile product
10 Linear axis
11 Base plate
12 Slide for transverse movement of the uptake device 3
13 Direction of relative movement of the uptake device relative to the hook
14 Gap in the uptake device 3
14a Gap in the uptake device 3 with semi-finished textile product
15 Needle
16 Hook on the needle
17 Direction of the relative movement of the first sub-unit relative to the second sub-unit
18 Middle of the gap 14
19 Cellular material
20 Chopped semi-finished textile product after being fed through the cellular material
21 Scissors for manual cutting of the semi-finished textile product
22 Fed-through pieces of semi-finished textile product in rows
23 Complete cellular material after all the pieces of the semi-finished textile product have been worked in
24 Top partial system
25 Bottom partial system
26 Computer unit
27 Middle unit for supporting the material to be processed
28 Transport mechanism of the middle unit
29 Lines for controlling the various units by the computer unit
30 Hooked needle
31 Shaft
32 Tip
33 Eyelet
34 First limb
35 Closure mechanism
36 Flap
37 Tapered region
600 System with top and bottom partial system 601 Needle
602 Top partial system
603 Bottom partial system
604 Needle bar drive
605 Supply lines for bottom drive
606 Region for placing the material to be reinforced
607 Bar of the needle bar drive

The invention claimed is:

1. An apparatus for manufacturing a reinforced cellular material and for taking up a semi-finished textile product in a hook, the apparatus comprising:
a first sub-unit with a transport device and a second sub-unit with an uptake device,
wherein the transport device is equipped to convey the semi-finished textile product into the uptake device;
wherein the first sub-unit and the second sub-unit are adapted to lay out the semi-finished textile product at a defined length as a result of a first relative movement of the first sub-unit relative to the second sub-unit; and
wherein the uptake device of the second sub-unit is configured to place the semi-finished textile product in the hook as a result of a second relative movement of the uptake device relative to the hook.

2. The apparatus of claim 1 further comprising:
at least one cutting implement adapted to cut the semi-finished textile product at a defined length.

3. The apparatus of claim 2,
wherein the at least one cutting implement is attached to the first sub-unit.

4. The apparatus of claim 1,
wherein the hook is provided on a hooked needle.

5. The apparatus of claim 1, further comprising:
pneumatic drive means to generate at least one of the first and second relative movements.

6. The apparatus of claim 1, wherein the uptake device further comprising:
a vertical gap;
wherein the vertical gap is equipped such that the hook is insertable into the gap; and
wherein the first relative movement of the first sub-unit relative to the second sub-unit can be implemented such that, after the first relative movement has been carried out, the middle of the semi-finished textile product is located in the middle of the gap.

7. The apparatus of claim 1,
wherein the transport device comprises at least one transport roller.

8. A system for manufacturing reinforced cellular materials, the system comprising:
a bottom partial system and a top partial system;
wherein the cellular material to be reinforced is adapted to be placed between the bottom and top partial systems;
wherein the bottom partial system comprises an apparatus according to claim 1; and
wherein the top partial system comprises a needle bar drive.

9. The system of claim 8 further comprising:
a transport mechanism for transporting the cellular material to be reinforced,
wherein the transport mechanism is configured such that the material can be transported in predetermined steps between the bottom and top partial systems.

10. The system of claim 9, with the system further comprising:
a computer unit for controlling at least one of the apparatus according to claim 1, the transport mechanism or the top partial system.

11. A method for taking up semi-finished textile products in a hook for reinforcing materials, the method comprising:
laying the semi-finished product onto a bottom face of a material to be reinforced;
positioning a middle of the semi-finished product at a location of uptake;
inserting the hook into the material to be reinforced;
placing the semi-finished product in the hook;
withdrawing the hook while at the same time positioning the semi-finished product in the material to be reinforced; and
by a cutting implement, cutting the semi-finished textile product at a defined length at the bottom face of the material to be reinforced.

12. The method of claim 11, further comprising:
releasing the semi-finished textile product from the hook.

13. The method of claim 11,
wherein the hook is situated on a hooked needle; and
performing a relative movement of the semi-finished product relative to the hooked needle, thereby placing the semi-finished product in the hook.

14. The method of claim 11,
wherein the process steps are carried out repeatedly, and
wherein a closed seam is provided as a result of omitting to cut the semi-finished textile product.

15. The method of claim 11,
wherein the semi-finished textile product is a fibre bundle; and
wherein the fibres are laid up so as to be parallel and stretched in the material to be reinforced.

16. The method of claim 11,
wherein the material is a cellular material.

17. The method of claim 11, further comprising:
providing an apparatus having a first sub-unit and a second sub-unit;
wherein the first sub-unit comprises a transport device;
wherein the second sub-unit comprises an uptake device;
transporting the semi-finished part via the transport device into the uptake device.

18. The method of claim 11, further comprising:
performing a relative movement of the first sub-unit relative to the second sub-unit, thereby providing the laying of the semi-finished part.

* * * * *